(12) United States Patent
Thomanek

(10) Patent No.: US 12,540,713 B2
(45) Date of Patent: Feb. 3, 2026

(54) LIGHT GUIDE FOR A LIGHTING ELEMENT

(71) Applicant: HELLA GMBH & CO. KGAA, Lippstadt (DE)

(72) Inventor: Niko Thomanek, Soest (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 18/917,375

(22) Filed: Oct. 16, 2024

(65) Prior Publication Data

US 2025/0129908 A1    Apr. 24, 2025

(30) Foreign Application Priority Data

Oct. 24, 2023 (DE) .......................... 102023129236.6

(51) Int. Cl.
*F21S 41/24* (2018.01)
*F21V 8/00* (2006.01)

(52) U.S. Cl.
CPC ............ *F21S 41/24* (2018.01); *G02B 6/0016* (2013.01); *G02B 6/0018* (2013.01)

(58) Field of Classification Search
CPC ...... F21S 43/235; F21S 43/236; F21S 43/237; F21S 43/239; F21S 43/241; F21S 43/242; F21S 43/243; F21S 43/245; F21S 43/246; F21S 43/247; F21S 43/249; F21S 43/2492; F21S 43/251; F21S 43/252; F21S 43/253; F21S 43/255; F21W 2107/17; F21W 2103/00; F21W 2103/10; F21W 2103/15; F21W 2103/20; F21W 2103/25; F21W 2103/30; F21W 2103/35; F21W 2103/40; F21W 2103/45; F21W 2103/5055; F21W 2103/60; G02B 6/0038
See application file for complete search history.

(56) References Cited

U.S. PATENT DOCUMENTS

| | | | |
|---|---|---|---|
| 6,275,339 B1 * | 8/2001 | Chazallet | G02B 6/0038 349/64 |
| 2003/0128538 A1 * | 7/2003 | Shinohara | G02B 6/0038 362/610 |
| 2009/0219731 A1 * | 9/2009 | Martin | F21S 43/243 362/509 |
| 2015/0009696 A1 | 1/2015 | Ogata | |

FOREIGN PATENT DOCUMENTS

| | | |
|---|---|---|
| CN | 108980773 A | 12/2018 |
| DE | 10149044 A1 | 4/2003 |
| DE | 102016109957 A1 | 12/2016 |
| EP | 3550205 A1 | 10/2019 |
| JP | 2021046005 A | 3/2021 |
| KR | 1020160077723 A | 7/2016 |
| WO | 2019134822 A1 | 7/2019 |

\* cited by examiner

*Primary Examiner* — Robert J May

(74) *Attorney, Agent, or Firm* — WARNER NORCROSS + JUDD LLP

(57) ABSTRACT

The present invention relates to a light guide for a lighting element, wherein the light guide comprises a lighting body, wherein the lighting body comprises an interface for coupling in light beams.

9 Claims, 5 Drawing Sheets

LIGHT GUIDE FOR A LIGHTING ELEMENT

CROSS-REFERENCE TO RELATED APPLICATIONS

The present application claims the benefit of German Patent Application No. 10-2023-129-236.6, filed Oct. 24, 2023, the disclosure of which is incorporated by reference.

FIELD OF THE INVENTION

The invention presented relates to a light guide for a lighting element, in particular a position light, a headlight, a vehicle and a manufacturing method.

BACKGROUND OF THE INVENTION

Due to traffic regulations, lighting elements such as position lights for vehicles must shine both in a main beam direction, e.g. along a roadway, and laterally, e.g. to the left and right of the roadway or in a periphery of the roadway. A position light should have a lateral beam angle of 80° to the main beam direction so that the position light is also clearly visible from a position to the side of a vehicle. Known position lights or marker lights are optimized for a single side of a vehicle and emit light in a main beam direction and a single side. Accordingly, two position lights usually work together to emit light on two sides. Furthermore, installation space is very limited, particularly for vehicles such as motorcycles.

SUMMARY OF THE INVENTION

The present invention is based on the object of providing a compact and safe lighting element, in particular a compact and safe position light, for a vehicle. Thus, according to a first aspect of the invention, a light guide for a lighting element, in particular a position light, is presented.

The presented light guide comprises a lighting body, wherein the lighting body comprises an interface for coupling light beams, wherein the lighting body comprises a plurality of alignment elements each configured to radiate light beams coupled into the lighting body through a main radiation surface opposite the plurality of alignment elements directed in a main radiation direction, wherein the lighting body comprises at least one secondary side surface which extends laterally between the main radiation surface and the number of alignment elements, wherein the lighting body comprises at least one side emitting surface which extends opposite the at least one secondary side surface, wherein the at least one side surface comprises a plurality of smooth transmitting surfaces and a plurality of rough surfaces, wherein respective transmitting surfaces are configured to transmit light beams within the lighting body, wherein respective rough surfaces are configured to diffusely reflect light beams in such a manner that at least a portion of light beams reflected by respective rough surfaces exit the lighting body through the side emitting surface.

In the context of the presented invention, an alignment element is to be understood as an optical element configured to align or refract light beams incident into the alignment element so that they are emitted in a predetermined direction.

In the context of the invention presented, a rough surface is to be understood as a surface on the lighting body of the light guide presented, which has an increased roughness compared to a clear surface, such as the main radiation surface. The roughness can, for example, correspond to the roughness specified in VDI 3400-33.

A rough surface can, for example, have a structure, in particular a large number of elevations and valleys. For example, a rough surface can be similar to sandpaper, whereas a clear surface or emitting surface can be flat or smooth, e.g. similar to writing paper.

The light guide presented is based on the principle that it comprises several radiation surfaces for coupling out or emitting light, namely on the one hand a main radiation surface through which directed light beams are emitted in a main radiation direction, and on the other hand a side emitting surface through which light beams reflected from respective rough surfaces and light beams traveling randomly through the lighting body are coupled out or emitted. Due to the main radiation surface, the presented light guide is recognizable as luminous from a main direction, especially from the front. Due to the side emitting surface, the light guide can be recognized as luminous from a lateral direction, i.e. laterally offset relative to the main direction, in particular in an area between in particular 45° and at least 80° of an arc laterally offset to the main direction. Due to the rough surfaces provided according to the invention, light beams traveling in the lighting body are diffusely reflected such that they at least partially hit a side emitting surface and exit the lighting body there.

The lighting body provided according to the invention may in particular be made of transparent plastic. For example, the lighting body can be provided in an injection molding process or a generative manufacturing method.

It may be provided that the main radiation surface forms a half tube. A half tube causes light beams to be transmitted or travel within the lighting body by total reflection, so that the entire lighting body is irradiated with light beams and the entire main radiation surface and the entire side emitting surface are illuminated. Furthermore, a main radiation surface in the form of a half tube enables visibility of the half tube from a position lateral to a main radiation direction, in particular from a position less than 80° to a main radiation direction.

It may further be provided that the lighting body comprises a substantially horizontally extending first part and a substantially vertically extending second part, wherein the first part is shorter than the second part. For example, the lighting body can be L-shaped or substantially L-shaped, so that a large side emitting surface is formed, particularly on the long vertical part, which can be perceived as illuminating particularly well from a position to the side of the light guide.

It can also be provided that the respective rough surfaces are round, at least partially rounded, polygonal, square or rectangular, in particular strip-shaped. Generally speaking, the rough surfaces can have any technically suitable shape as long as they diffusely reflect light beams. It may further be provided that the plurality of rough surfaces comprises a number of strip-shaped rough surfaces extending over an entire height of a secondary side surface between the main radiation surface and a rear side having the plurality of alignment elements. Rough surfaces that extend over the entire height of a side surface capture a large proportion of the light beams traveling through the lighting body and emit them diffusely.

It can also be provided that the respective rough surfaces are spaced apart by respective forwarding surfaces. Forwarding surfaces ensure that light beams coupled into the light guide by a light source on a first side also travel to areas of the light guide remote from the first side. For this purpose, the light beams are totally reflected by the forwarding surfaces. Accordingly, a compromise between the luminosity of the side emitting surface and the luminosity over the entire light guide can be achieved by using rough surfaces that are spaced apart by respective forwarding surfaces. In particular, an area of the respective forwarding surfaces can vary over the length of the lighting body so that, for example, no or only minimal forwarding surfaces are formed at an end opposite the first end and maximum forwarding surfaces are formed at the first end.

According to a second aspect, the presented invention relates to a lighting element, in particular a position light, for a vehicle, wherein the lighting element or the position light comprises a plurality of possible embodiments of the presented light guide, wherein at least one light guide is aligned with its emitting surface towards a first side of the position light and at least one further light guide is aligned with its emitting surface towards a second side opposite the first side.

Due to the light guides according to the invention, the position light presented is particularly easy to recognize as illuminated from a position to the side of a main emission direction of the position light. In particular, the light guides of the position light can be configured to illuminate an area between in particular 45° and at least 80° to the side of the main direction of radiation.

According to a third aspect, the presented invention relates to a headlight for a vehicle, wherein the headlight comprises a possible embodiment of the presented light element, in particular position light. Due to the position light, the headlight presented can be designed to be particularly compact, making it particularly suitable for use on motorcycles, such as motorcycles.

According to a fourth aspect, the presented invention relates to a vehicle, wherein the vehicle comprises a possible embodiment of the presented light element, in the form of a position light, or a possible embodiment of the presented headlight. In particular, the vehicle presented can be a motorcycle.

According to a fifth aspect, the presented invention relates to a manufacturing method for a possible embodiment of the presented light guide. The manufacturing method presented comprises the provision of a base body and the introduction of rough surfaces into the base body by means of a laser. A laser can be used to process a lighting body made of transparent plastic, for example, particularly efficiently and precisely so that a large number of rough surfaces are formed on the lighting body.

These and other features and advantages of the present invention will become apparent from the following description of the invention. Before the embodiments of the invention are explained in detail, it is to be understood that the invention is not limited to the details of operation set forth in the following description. The invention may be implemented in various other embodiments and of being practiced or being carried out in alternative ways not expressly disclosed herein. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

The invention is explained in more detail in the attached drawings. In the figures:

FIG. 6 shows a sectional view of the light guide of FIG. 2.

DETAILED DESCRIPTION OF THE CURRENT EMBODIMENTS

Figure 1:
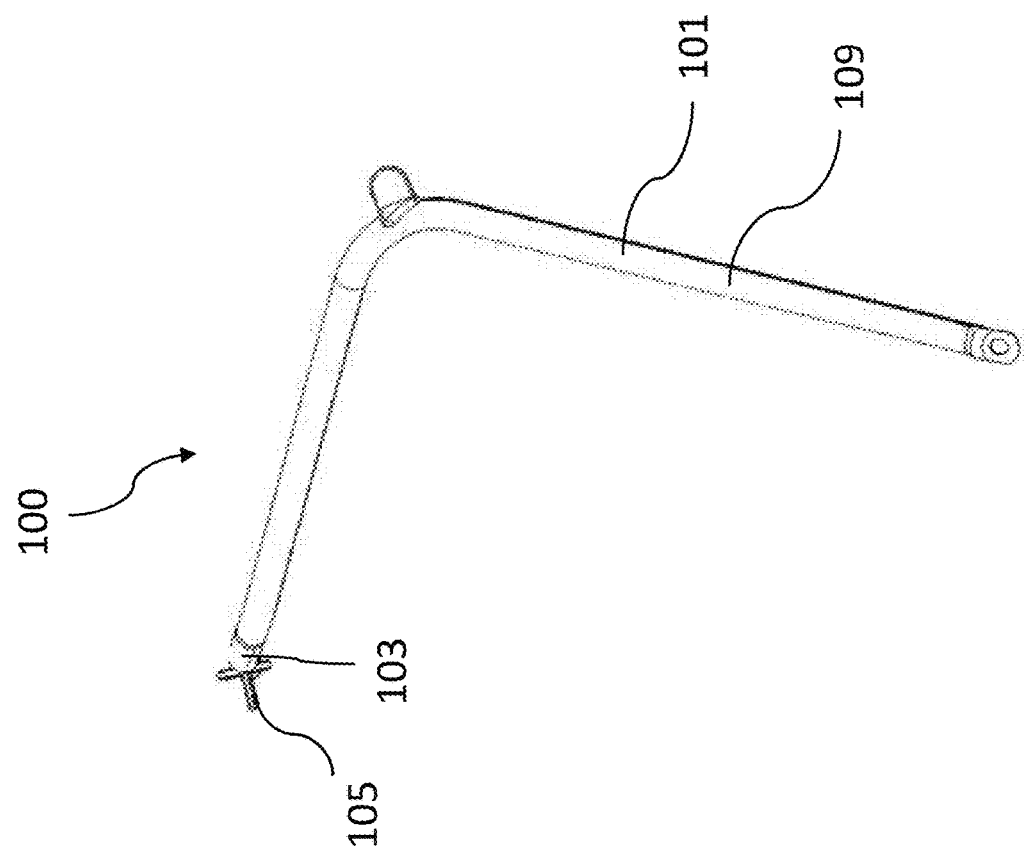
FIG. 1 shoes a possible design of the light guide presented.

FIG. 1 shows a light guide 100 for a lighting element 200, such as a headlight.

The light guide 100 comprises a lighting body 101 comprising an interface 103 for coupling light beams through a light source 105.

Figure 2:
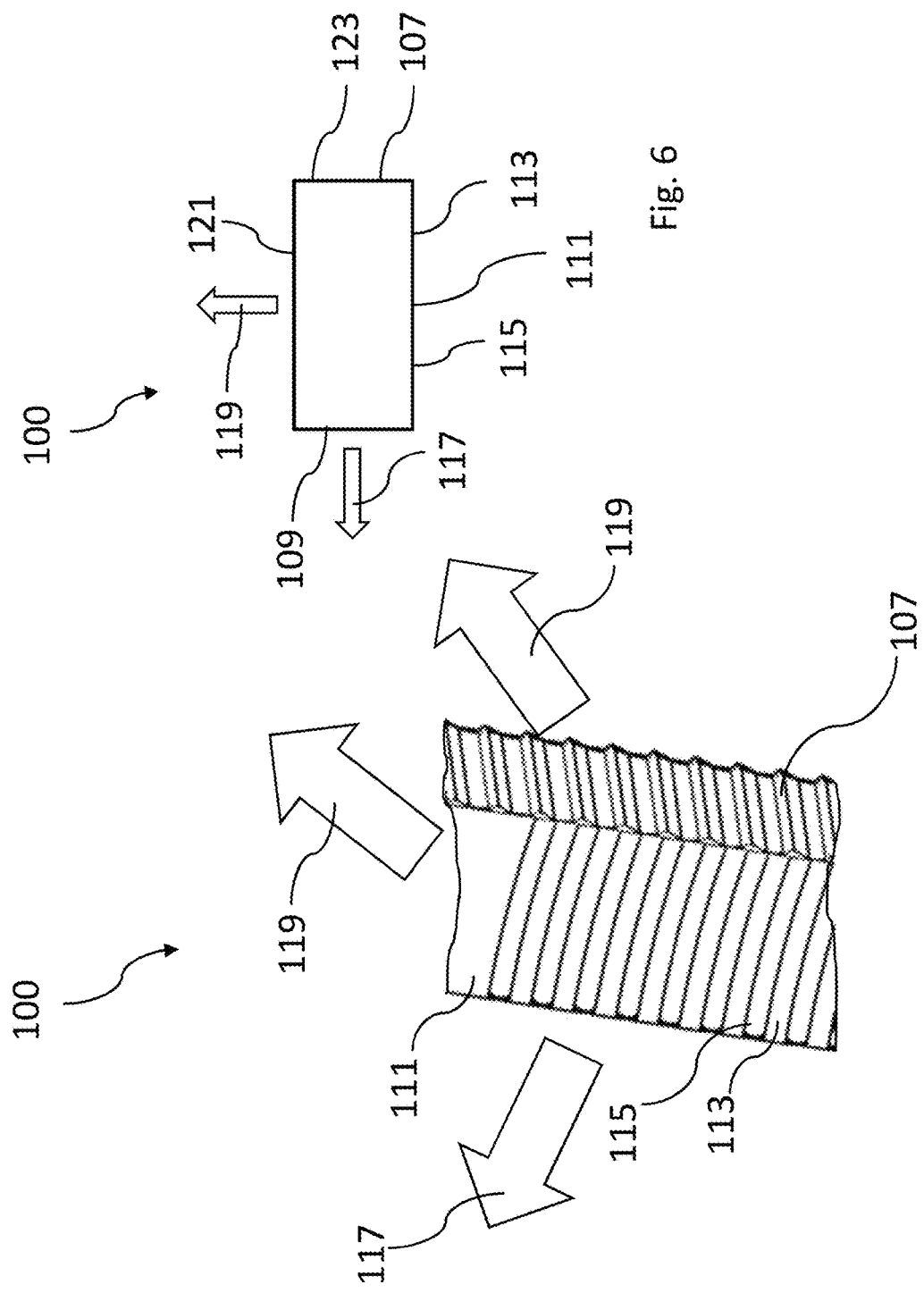
FIG. 2 shows a detailed view of the light guide of FIG. 1.

Furthermore, the lighting body 101 comprises a plurality of alignment elements 107, as shown in FIG. 2, each configured to direct light beams coupled into the lighting body 101 through a main radiation surface 109 opposite the plurality of alignment elements 107 in a main radiation direction, as indicated by arrow 109.

As can also be seen in FIG. 2, the lighting body 101 comprises at least one secondary side surface 111, which extends laterally between the main radiation surface 109 and the number of alignment elements 107.

Further, the lighting body 101 comprises at least one side emitting surface (not shown) extending opposite the at least one side surface 111, wherein the at least one secondary side surface 111 comprises a plurality of smooth forwarding surfaces 113 and a plurality of rough surfaces 115.

The side emitting surface covers a side area, as indicated by arrows 119. This outshone side area can, for example, span at least 80° of an arc, so that the light guide 100 is easily recognizable as uniformly illuminated from the entire side area, in particular between 1° and 90° to the side of the main emission direction.

The forwarding surfaces 113 are configured to forward light beams within the lighting body 101.

The rough surfaces 115 are configured to diffusely reflect light beams so that at least a part of light beams reflected by respective rough surfaces 115 exit the lighting body 101 through the side emitting surface.

Figure 3:
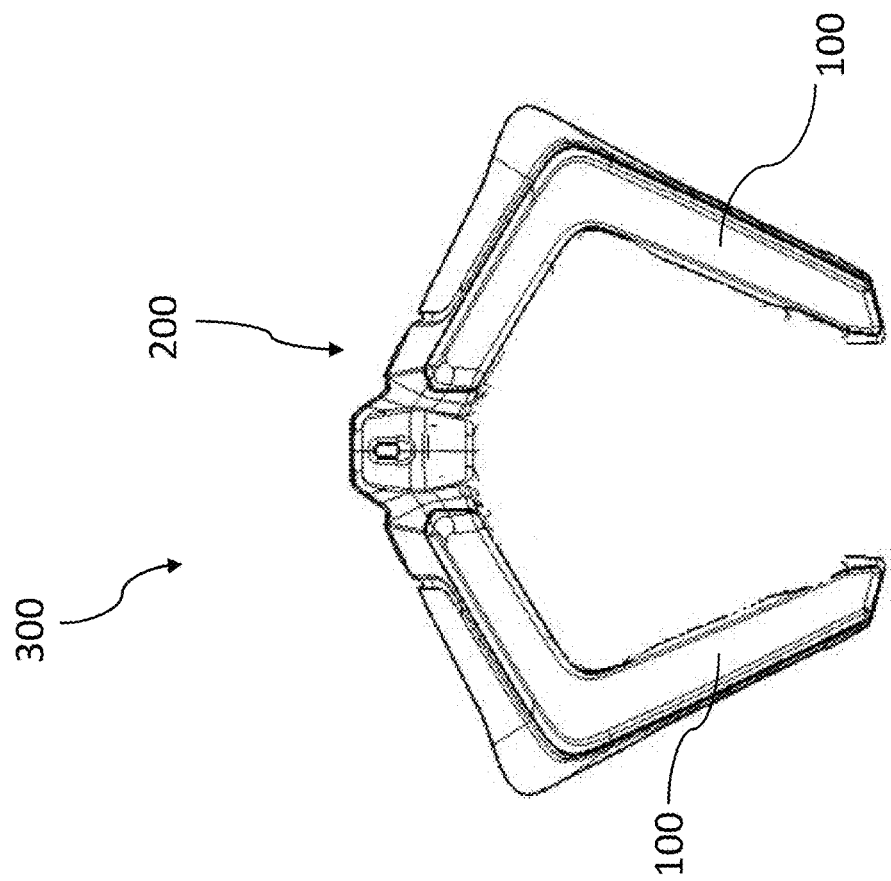
FIG. 3 shows a possible design of the headlight presented, which comprises a possible design of the light element/position light presented with the light guide of FIG. 1.

FIG. 3 shows a headlight 300 comprising a light element 200 designed as a position light. The position light 200 comprises several light guides 100 as shown in FIG. 1.

Figure 4:
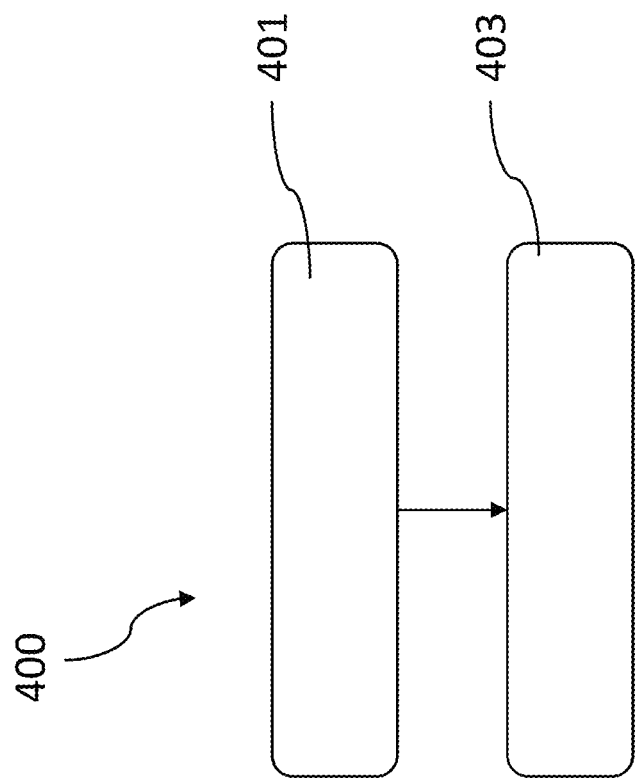
FIG. 4 shows a possible embodiment of the manufacturing method presented.

FIG. 4 shows a manufacturing method 400. The manufacturing method 400 comprises a providing step 401, in which a base body of a lighting body is provided, and an introducing step 403, in which rough surfaces are introduced into the base body by means of a laser.

Figure 5:
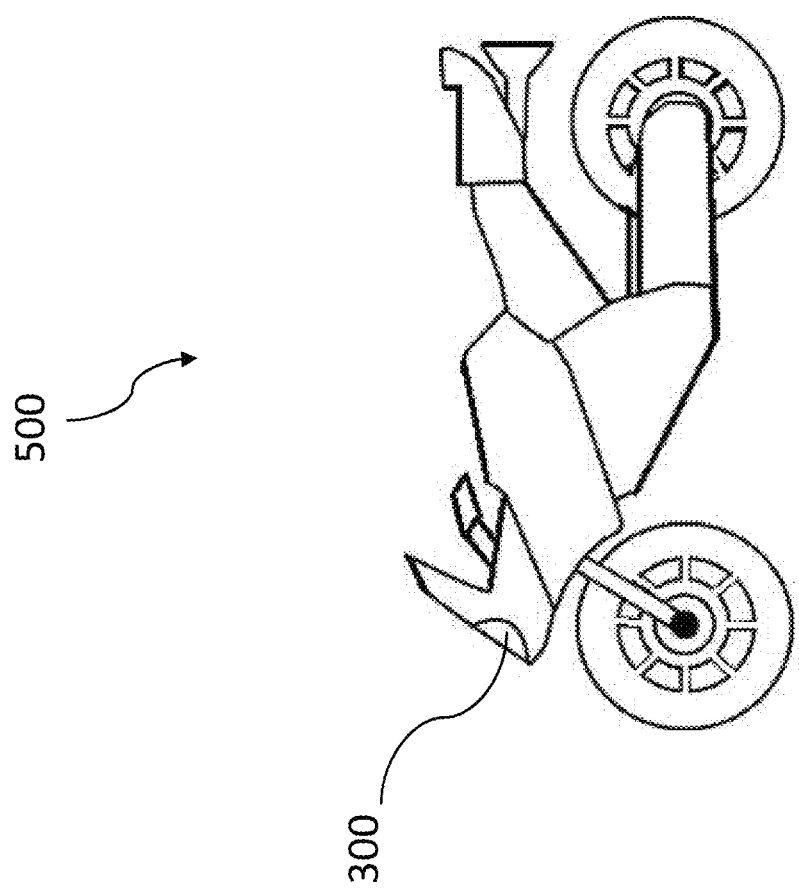
FIG. 5 shows a possible design of the vehicle presented.

FIG. 5 shows a vehicle 500 in the form of a motorcycle. The vehicle 500 comprises the headlight 300 as shown in FIG. 3.

FIG. 6 shows a sectional view of the light guide 100 according to FIG. 2. In FIG. 6, in addition to FIG. 2, the side emitting surface 121 and the rear side 123 of the light guide 100 are shown.

LIST OF REFERENCE NUMERALS 100 light guide
101 lighting body
103 interface
105 light source
107 alignment element
109 main radiation surface
111 secondary side surface
113 forwarding surface
115 rough surface
117 arrow
119 arrow
200 light element/position light
300 headlight
400 manufacturing method
401 provisioning step
403 insertion step
500 vehicle The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A light guide for a lighting element, comprising:
a lighting body, wherein the lighting body includes:
   an interface for in-coupled light beams,
   a plurality of alignment elements on a rear side of the lighting body, the plurality of alignment elements being configured to radiate in-coupled light beams through a main radiation surface opposite the plurality of alignment elements that are directed in a main radiation direction,
   at least one secondary side surface extending laterally between the main radiation surface and the plurality of alignment elements,
   at least one side emitting surface which extends opposite the at least one secondary side surface,
   wherein the at least one secondary side surface comprises a plurality of smooth forwarding surfaces and a plurality of rough surfaces,
   wherein the plurality of smooth forwarding surfaces are configured to forward light beams within the lighting body,
   wherein the plurality of rough surfaces comprise alternating rows extending from the rear side of the lighting body to the main radiation surface of the lighting body, the alternating rows being spaced apart by respective ones of the plurality of smooth forwarding surfaces, the plurality of rough surfaces being configured to diffusively reflect light rays so that at least a portion of light rays reflected by the plurality of rough surfaces exit the lighting body through the at least one side emitting surface.

2. The light guide of claim 1, wherein the plurality of rough surfaces have a roughness in accordance with VDI 3400-33.

3. The light guide of claim 1, wherein the main radiation surface forms a half tube.

4. The light guide of claim 1, wherein the lighting body comprises a substantially horizontally extending first part and a substantially vertically extending second part, wherein the first part is shorter than the second part.

5. The light guide of claim 1, wherein the plurality of rough surfaces are round, partially rounded, polygonal, quadrangular, rectangular, or strip-shaped.

6. A lighting element for a vehicle, comprising:
a plurality of the light guides of claim 1.

7. A headlight for a vehicle, the headlight comprising:
the lighting element of claim 6.

8. A vehicle comprising the lighting element according to claim 6.

9. A method of manufacturing the light guide of claim 1, comprising:
providing a base body; and
inserting rough surfaces into the base body using a laser.

* * * * *